(12) United States Patent
Kumar et al.

(10) Patent No.: US 9,563,912 B2
(45) Date of Patent: Feb. 7, 2017

(54) AUTO RECOGNITION OF ACQUIRABLE ENTITIES

(71) Applicant: Microsoft Technology Licensing, LLC, Redmond, WA (US)

(72) Inventors: Dileep R. Kumar, Redmond, WA (US); Philippe Blais, Monroe, WA (US); Shrey Nitin Shah, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 6 days.

(21) Appl. No.: 14/460,498

(22) Filed: Aug. 15, 2014

(65) Prior Publication Data

US 2016/0048899 A1    Feb. 18, 2016

(51) Int. Cl.
*G06Q 30/06*    (2012.01)

(52) U.S. Cl.
CPC ...... *G06Q 30/0631* (2013.01); *G06Q 30/0633* (2013.01); *G06Q 30/0643* (2013.01)

(58) Field of Classification Search
CPC ............................. G06Q 30/06; G06Q 30/0282
USPC .............................................. 705/26.1, 26.7
See application file for complete search history.

(56) References Cited

U.S. PATENT DOCUMENTS

| 6,981,040 | B1 | 12/2005 | Konig et al. |
| 7,444,319 | B1 | 10/2008 | Sathyanarayan |
| 8,620,767 | B2 | 12/2013 | Linden et al. |
| 2006/0200556 | A1* | 9/2006 | Brave ............... G06F 17/30867 709/224 |
| 2007/0299817 | A1 | 12/2007 | Mathew et al. |
| 2009/0297045 | A1 | 12/2009 | Poetker et al. |
| 2012/0084828 | A1* | 4/2012 | Rowe ................... H04N 21/252 725/110 |
| 2013/0006904 | A1* | 1/2013 | Horvitz ................. G06Q 10/10 706/46 |
| 2015/0186381 | A1* | 7/2015 | Yan ................... G06F 17/30997 707/728 |
| 2015/0220979 | A1* | 8/2015 | Ouimet ............. G06Q 30/0633 705/14.49 |

OTHER PUBLICATIONS

"Second Written Opinion Issued in PCT Application No. PCT/US2015/044938", Mailed Date: Jun. 23, 2016, 6 Pages.
Madrigal, Alexis C., "I'm Being Followed: How Google—and 104 Other Companies—Are Tracking Me on the Web", Published on: Feb. 29, 2012 Available at: http://www.theatlantic.com/technology/archive/2012/02/im-being-followed-how-google-151-and-104-other-companies-151-are-tracking-me-on-the-web/253758/.

(Continued)

*Primary Examiner* — Mila Airapetian
(74) *Attorney, Agent, or Firm* — Aaron Chatterjee; Daniel Choi; Micky Minhas

(57) ABSTRACT

A method of identifying, to a user, acquirable entities that the user may be interested in is disclosed. The method includes at a component configured to analyze information across a plurality of applications, analyzing in one or more of the applications being used by a user, content in the one or more applications. The method further includes based on the content, identifying one or more acquirable entities from the content. The method further includes identifying to the user the identified acquirable entities.

20 Claims, 5 Drawing Sheets

(56) References Cited

OTHER PUBLICATIONS

"Product Recommendations Solution", Published on: Mar. 18, 2012 Available at: http://www-01.ibm.com/software/marketing-solutions/products-recommendation-solution/.

Prassas, et al., "A Recommender System for Online Shopping Based on Past Customer Behaviour", In Proceedings of 14th Bled Electronic Commerce Conference, Jun. 25, 2001, 17 pages.

Crum, Chris, "Google Extends Ad Targeting Based on Browsing History. Good or Bad?", Published on: Jun. 25, 2011 Available at: http://www.webpronews.com/google-interest-based-advertising-2011-06.

Curtis, Sohpie, "The Innovations That Took Amazon From Online Bookseller to Dominant Global Marketplace", Published on: Oct. 15, 2013 Available at: http://www.businessinsider.in/The-Innovations-That-Took-Amazon-From-Online-Bookseller-To-Dominant-Global-Marketplace/articleshow/24196873.cms.

Denicola, Louis, "Price Alerts Help You Find the Best Time to Buy", Published on: Oct. 29, 2012 Available at: https://shine.yahoo.com/work-money/price-alerts-help-best-time-buy-125200105.html.

"Consumer Behavior: How People Make Buying Decisions", Published on: Aug. 10, 2013 Available at: http://www.saylor.org/site/wp-content/uploads/2013/02/BUS203-PoM-Ch3.pdf.

"International Search Report & Written Opinion Issued in PCT Application No. PCT/US2015/044938", Mailed Date: Oct. 29, 2015, 10 Pages.

"International Preliminary Report on Patentability Issued in PCT Application No. PCT/US2015/044938", Mailed Date: Nov. 11, 2016, 7 Pages.

\* cited by examiner

AUTO RECOGNITION OF ACQUIRABLE ENTITIES

BACKGROUND

Background and Relevant Art

Large portions of the world's population use computing devices on a frequent basis. Indeed, many individuals may spend the majority of their waking hours working and/or recreating with computing devices. Individuals may use computing devices for work, research, recreation, shopping for (and ultimately purchasing) goods and services, etc.

Data has shown that one of the important blockers for any purchase on a computing device is the number of steps involved in the purchase flow. People drop off at each step along the way of making a purchase and the more the number of steps, the more the possibility for drop off. Also, there are a significant percentage of people who come to know about items that they may like to purchase from sources other than an e-commerce website. For example, user may obtain information about items from an article while browsing the web, a retailer promoting their apps on their home page, someone posting a link in social media sites, a friend sending links to items that he/she recommends etc.

While targeted advertising has been performed using web browser functionality, such as cookies, to monitor e-commerce sites that a user might visit, users using apps other than web browsers or not visiting e-commerce sites may have additional inconvenience when attempting to purchase items that they are researching or may otherwise be interested in.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method of identifying, to a user, acquirable entities that the user may be interested in. The method includes at a component configured to analyze information across a plurality of applications, analyzing in one or more of the applications being used by a user, content in the one or more applications. The method further includes based on the content, identifying one or more acquirable entities from the content. The method further includes identifying to the user the identified acquirable entities.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 6 illustrates a method of identifying to a user acquirable entities that the user may be interested in.

DETAILED DESCRIPTION

Embodiments described herein may include functionality for discovering various acquirable entities described or depicted on several different user interfaces used by a user. Such acquirable entities may include, for example, items that can be purchased, sampled, obtained through free distribution, etc. Such acquirable entities may be obtained through physical delivery or pick-up for physical items, by download for various digital items, or otherwise appropriately acquired. Acquirable entities may also include services. For example, an acquirable entity may include a taxi cab ride, house cleaning, yard work, or virtually any other service.

Figure 1:
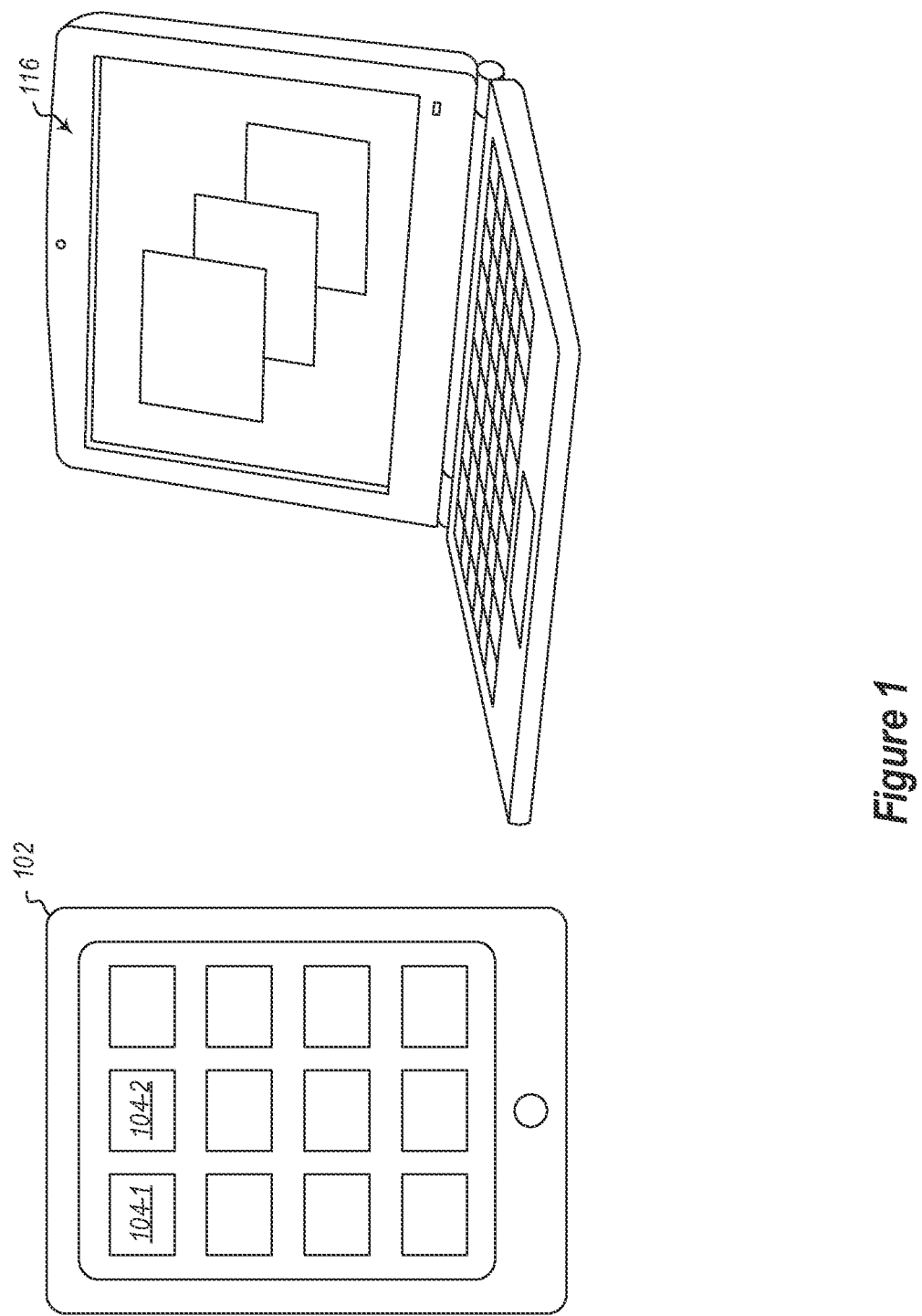
FIG. 1 illustrates devices that user may use to view content related to acquirable entities.

As noted, embodiments may be able to identify acquirable entities across a number of different user interfaces used by a particular user. Examples are now illustrated with reference to FIG. 1. FIG. 1 illustrates a device 102. The device 102 may be, for example, a mobile phone, tablet or other device. The device may have a number of apps (short for application and typically used to describe applications on a mobile device, but may be used herein to describe any appropriate application) installed on the device. For example, the device may have a browser app, an e-commerce interface app, a word-processor app, a game app, an app marketplace app, a mapping app, or any one of a number of different apps. Any or all of these different apps, or other appropriate apps, may be used to identify acquirable entities.

A user may select one of the apps 104-1 which causes an interface 106 (see FIG. 2) to be opened to the user. The interface 106 may include various pieces of text 108, images 110, links 112, videos, music, metadata, etc. that describe or depict acquirable entities. These acquirable entities can be identified and stored in a database 114 for later identification to a user. The database 114 may be stored directly on the device 102 and/or may be stored in remote storage at a service provider.

As noted, a user may select other apps on the device 102. For example, the user may select the app 104-2 for use. A different user interface for that app 104-2 may be displayed with various depictions and/or descriptions of acquirable entities. Notably, in some embodiments, the user may manually create the depictions and/or descriptions of acquirable entities. For example, using a word processing app, the user may create a description of an acquirable entity. Using a camera app, a user may take a picture of an acquirable entity. Virtually any app can have depictions and/or descriptions of acquirable entities that can be identified by embodiments of the invention.

The database 114 may store acquirable entities across multiple apps. Indeed, the database 114 may store acquirable entities across multiple devices. Thus, as illustrated in FIG. 1, a user may use a device 102 with various apps, but may also use a laptop computer 116 which provides access to various applications and interfaces. Embodiments can identify acquirable entities across the multiple apps and/or devices to provide an encompassing representation of acquirable entities that a user is interested in a variety of different contexts.

This cross-app and/or cross device functionality may be accomplished in a number of different ways. For example, in one example illustrated in FIG. 3, an operating system 118 on the device 102 may include the functionality for identifying acquirable entities. Thus any apps 104 installed on top of the operating system 118 may be searched by the operating system for identification of acquirable entities. Further, a user account 120 may be installed in the context of the operating system. This user account may allow for linking between devices which also allow the user to establish the user account 120. The operating systems on different devices may have the ability to collaborate based on a user account basis.

Figure 4:
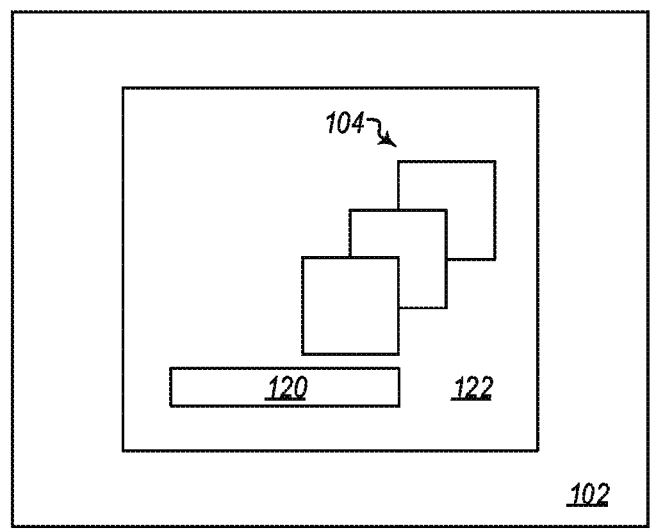
FIG. 4 illustrates an application framework with functionality for identifying acquirable entities.

In an alternative example illustrated in FIG. 4, the device 102 may include an application framework 122. Apps 104 are implemented within the context of the application framework 122. The application framework 122 may include functionality for identifying acquirable entities for any apps used within the context of the application framework 122. Again, in this example, a user account 120 may be implemented in the context of the application framework 122 which allows for cross-device entity tracking.

Embodiments may be able to identify acquirable entities in a number of different ways. For example, in any user interface of any application, embodiments may be able to identify textual names for acquirable entities, images of acquirable entities, link to acquirable entities, metadata describing acquirable entities, etc. For example, in some embodiments, text, images, videos, music, links, etc. could be put through an entity recognition search engine 124 (see FIG. 2), such as Bing Entity recognition available from Microsoft Corporation of Redmond Wash. to determine whether or not a particular user interface lists, describes, or depicts acquirable entities. This could be done by identifying textual names of acquirable entities, identifying images that depict acquirable entities, identifying a page being viewed in an interface that includes a URL that identifies acquirable entities, or identifying content in a user interface that includes acquirable entities or descriptions or depictions of acquirable entities, etc. For example, the operating system can take a copy of any of the following from any arbitrary app and send it across to Bing or similar services that can translate them to a known entity: (a) screenshot/rendering of what the app is showing (e.g. an image); (b) text/URLs on what the app is showing; (c) audio/video snippets from what the app is playing; (d) etc. The service can the provide entity information. This information can then be used to automatically build a database 114 of acquirable entities that the user is interested in, and the extent of the interest.

There are a number of different ways for determining the extent of interest. For example, embodiments may determine the amount of time a user spends in a user interface. For example, in a browser interface, embodiments may determine the amount of time spent on a webpage for an entity. Alternatively or additionally, embodiments may determine the number of times the entity is viewed or detected across multiple different interfaces. Alternatively or additionally embodiments may determine the prominence of an entity in an interface. For example, within an interface, embodiments may determine the number of times an entity is mentioned. Alternatively or additionally, embodiments may identify the context within which entities are described or depicted to determine extensive related treatment of the entity. When an image is displayed, embodiments may be able to identify the prominence of an entity within the image. For example, if an entity is more in focus than other entities, displayed larger, displayed more in the forefront, etc., the entity may be given a higher weight when determining likelihood of user interest. Alternatively or additionally, embodiments may determine how recently an entity is viewed by a user. Entities that are viewed more recently and/or with more frequency may be of high interest to a user who wishes to acquire those entities.

Embodiments can determine which of the discovered acquirable entities are of particular interest, which are of most interest to the user, or identify a ranking of probable interest in acquirable entities. Embodiments may additionally provide a simple mechanism for users to access an enumeration or identification of acquirable entities and a simple interface for requesting acquisition of the acquirable entities.

Notably, identifying acquirable entities can be done on a real time basis and/or based on a user's history. Thus, acquirable entities may be determined by examining what a user is currently viewing or consuming in applications and/or may be based on a past history of what a user has viewed or otherwise consumed in various applications.

Embodiments can use the preceding techniques to both identify acquirable entities of interest and also to identify the level of interest. For example, embodiments may maintain a database 114 of identified entities. The database 114 may have a ranking or rating system that is able to rank or determine probable interest in an entity based on various factors such as those identified above (e.g. frequency of viewing descriptions or depictions, how recent descriptions or depictions are views, prominence of descriptions or depictions in an interface, number of different interfaces in which an acquirable entity is viewed, etc.).

The ranking or rating can be used to determine if and/or how acquirable entities are presented to a user. For example, in some embodiments, once an acquirable entity is determined to be of sufficient interest to a user, a user interface element may indicate the acquirable entity to the user. Such interface elements may be pop-up windows, charms, pull-down menu alerts, user selectable elements, etc. Various scenarios will be illustrated in more detail below. The list may be presented in various ways. For example, the list may simply be an enumeration of acquirable entities. Alternatively, the list may be presented with links to various sources where entities may be acquired. Alternatively, the list may be presented in the context of a web store or other e-commerce portal. In yet another alternative, embodiments may present contextual ads not based on search, but based on user behavior.

In some embodiments, information about entities may be used to identify other related entities. For example, if a user has been researching printers, embodiments may identify ink cartridges that could be used with the printers being researched. Alternatively or additionally, a different printers with similar specifications or in similar price categories may be identified even though the user has not researched those specific printers.

Figure 5:
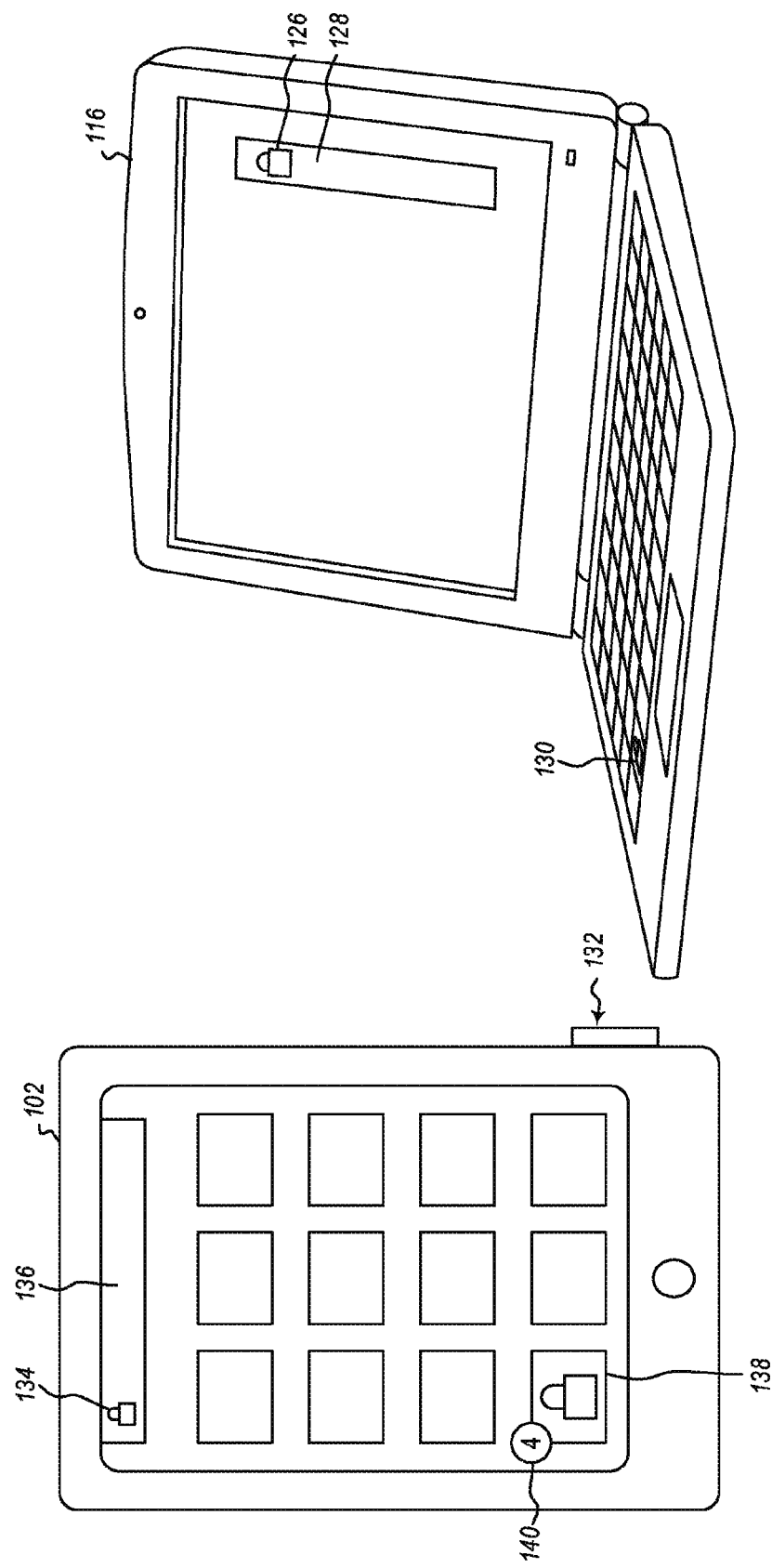
FIG. 5 illustrates various user interface elements that may be used to access additional information about acquirable entitles.

A user may be alerted to, and able to access a listing of acquirable entities in a number of different ways. FIG. 5 illustrates a number of different examples in the context of device 102 and the laptop 116. While a number of examples are shown, it should be appreciated that other elements may be used to accomplish functionality within the scope of embodiments of the invention.

FIG. 5 illustrates that in some embodiments, a charm 126 may allow a user to access a list of acquirable entities created by embodiments of the invention. The charm can be accessed from a charms bar 128 that may be constantly or selectively displayed on a device screen. The user can select the charm 126 which will cause a user interface to display the list of acquirable entities.

In an alternative or additional embodiment, a keyboard key 130 or other hardware key may be configured to provide access to a list of acquirable entities. In some such embodiments, a soft button 132 may be assigned functionality for opening a list of acquirable entities.

In some embodiments, a notification may be issued. For example, in some embodiments a toast notification 134 may alert a user that acquirable entities are available. For example, this may occur when embodiments have determined that a user has shown sufficient interest in an entity or that some other threshold for an entity has been reached. In some embodiments, the user can select the notification to obtain access to the list, or can pull down on a notification bar 136 to obtain the list or other user interface element giving access to the list of acquirable entities.

In some embodiments, an application and associated icon 138 can be used to alert a user regarding identified acquirable entities and/or provide access to a user to a list of acquirable entities. For example, a user may be able to select the icon 138 which causes an application interface to open, which can then be used to display a list of acquirable entities and/or an interface that facilitates a user acquiring an entity, such as a store interface or other appropriate interface.

In the example illustrated in FIG. 5, the icon 138 includes a badge counter 140. The badge counter 140 indicates a number of new or un-reviewed acquirable entities. Badge counter values may indicate a number of newly identified acquirable entities that meet some threshold requirement. For example, embodiments may identify some threshold level of interest or other threshold level that warrants alerting a user. The alert may be in the form of an increased badge counter number. Alerts may be built into the operating system itself.

In some embodiments, alerting a user to identified acquirable entities may be based on various external factors. For example, embodiments can identify that a user is in the proximity of geographical location where entities can be acquired. For example, if a user has hammers in their list of acquirable entities, and the user walks into or drives near a hardware store, an alert may be issued to the user indicating that entities on their list of acquirable entities could be easily obtained.

Similarly, in some embodiments, the list of acquirable entities may be reordered based on location such that entities that can be obtained more easily in a given location are prioritized in a more prominent location in the list. Alternatively, the entities may be listed more prominently in a displayed list of acquirable entities. Thus, for example, the list may be reordered, entities that can be obtained in a location can be highlighted, bolded, underlined, colored, or otherwise made more prominent.

Location may be determined in a number of different ways. For example, location may be identified based on GPS modules in a device, network triangulation, beacons at locations, etc.

Similarly, embodiments may present acquirable entities based on "digital location." Thus, for example, when a user navigates to some e-commerce site, the list may be arranged or entities made prominent (e.g. in the fashion described above for physical locations) if entities are acquirable at the particular e-commerce site. This differs from what is presently being done in that some e-commerce sites may offer acquirable entities that a user has looked at on the particular site. In contrast, embodiments can present users with a list or identification of acquirable entities identified as relevant based on a user's navigation to a plurality of different sites or use of a plurality of different apps. Indeed, the user may never have previously navigated to an acquirable entity on an e-commerce site, and yet be presented with a list and/or link on that e-commerce site based on other activities with other web pages and/or other apps.

In some embodiments, the entities could be made available from a store for a one-click purchase experience right within the browser/app or any other surface that the user is in. For example, a user may be able to select an entity from a webpage in a browser app (or even a word processor app) and purchase that entity directly from interaction within the app based on an underlying store being able to receive the interaction from the app to complete the transaction.

The list and potentially the order of the list of acquirable entities can be used for various other purposes. For example, the list may be used to implement highly targeted advertisements, provide price tracking in an interface, provide alerts to users, enable merchants to bid to make an offer on specific entities etc.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
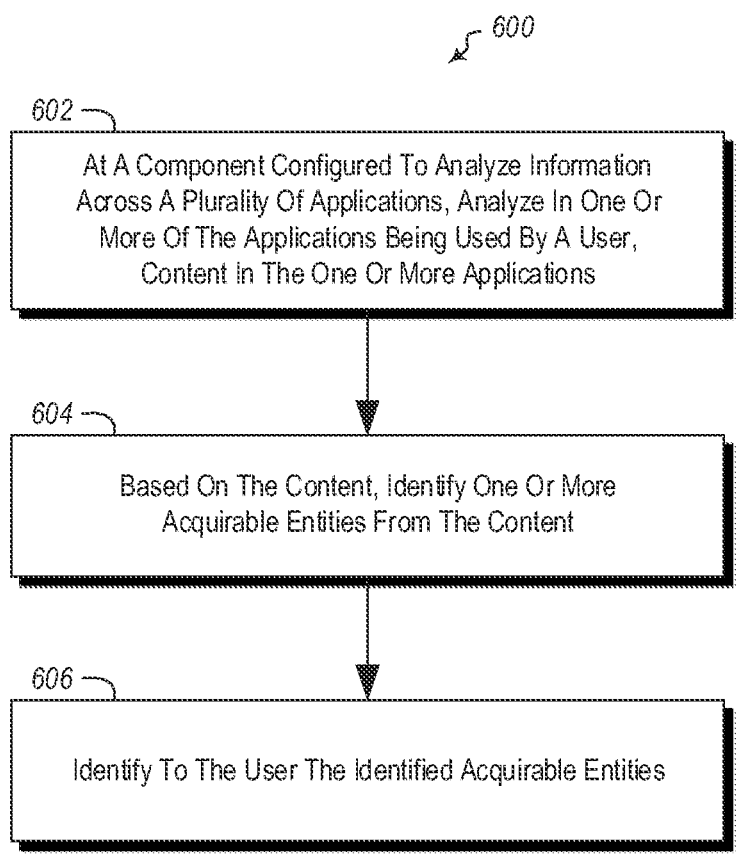

Referring now to FIG. 6, a method 600 is illustrated. The method 600 includes acts for identifying to a user, acquirable entities that the user may be interested in. For example, the method may identify purchasable or free items. Such items may be physically delivered. Alternatively the items may be electronically delivered such as through download.

Figure 3:
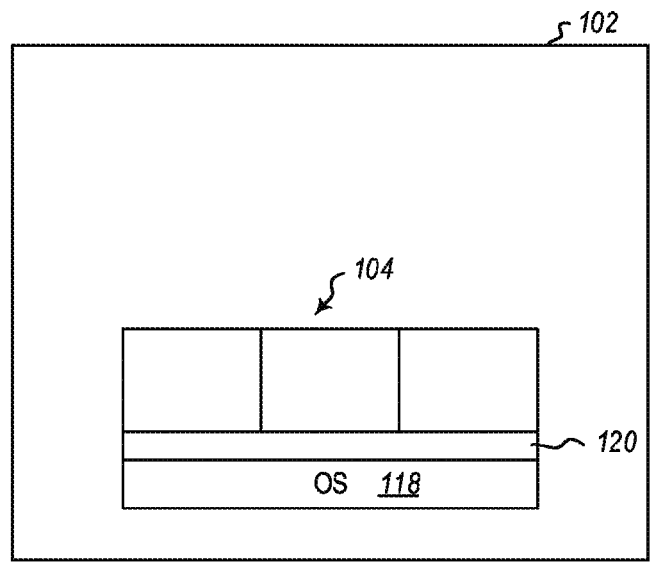
FIG. 3 illustrates an operating system that includes functionality for identifying acquirable entities.

The method 600 includes, at a component configured to analyze information across a plurality of applications, analyzing in one or more of the applications being used by a user, content in the one or more applications (act 602). For example, as illustrated in FIG. 3, the operating system 118 may include functionality for analyzing applications being used by a user. As illustrated in FIG. 4, an application framework 122 may include such functionality.

The method 600 further includes, based on the content, identifying one or more acquirable entities from the content (act 604).

The method 600 further includes identifying to the user the identified acquirable entities (act 606).

Figure 2:
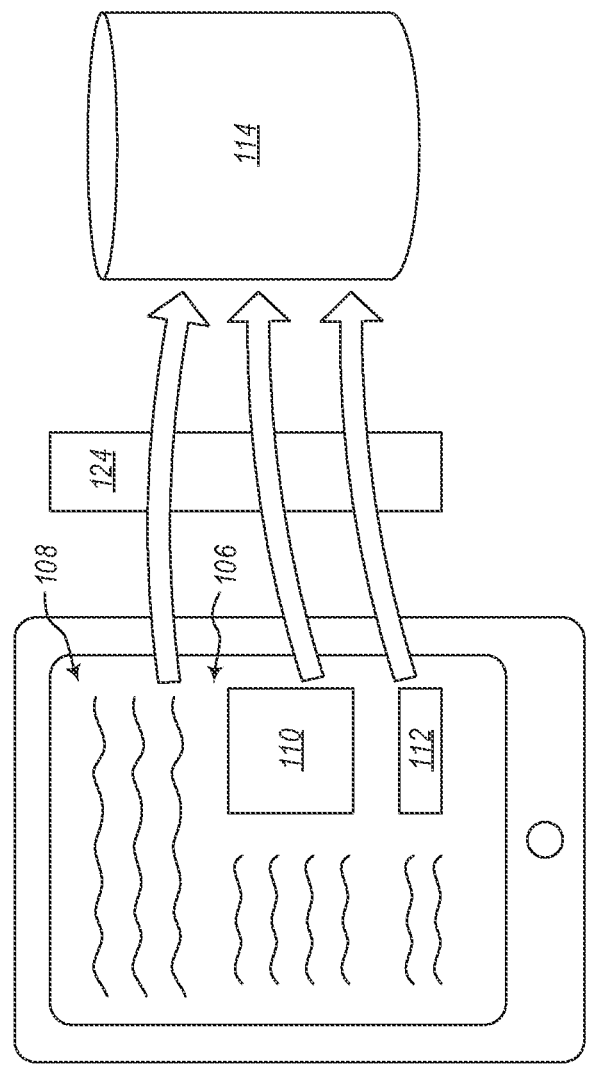
FIG. 2 illustrates a device interacting with a database.

The method 600 may be practiced where the content comprises at least one of text, video, music, images, metadata, links (such as hyperlinks), etc. The description above and FIG. 2 illustrate examples of how such content may be used.

The method 600 may be practiced where identifying to a user the identified acquirable entities is performed as a result of one or more of providing a charm and receiving user input, providing a keyboard key and receiving user input, providing a setting button and receiving user input, providing an icon and receiving user input, providing a toast notification and receiving user input, or providing a soft button and receiving user input, etc. Various such examples are illustrated above and in FIG. 5.

The method 600 may be practiced where identifying to a user the identified acquirable entities comprises providing a shopping list.

The method 600 may be practiced where identifying to a user the identified acquirable entities is performed after detecting that a user is in a location where the user may purchase one or more of the acquirable entities. As described above, this may be a physical location or a digital location.

The method 600 may be practiced where identifying to a user the identified acquirable entities comprises providing price comparisons, price tracking, and the like. Thus, for example, embodiments may identify to a user where they can acquire entities at different costs. Alternatively or additionally, embodiments may identify to a user the change in cost of an entity over time.

The method 600 may be practiced where identifying one or more acquirable entities in the content is performed based on a history of content from one or more applications to identify at least one of relevance, or frequency or pattern of content use, etc. Alternatively or additionally, the method 600 may be practiced real time context. Thus, entities can be identified based on history, in real time, or a combination of the two.

The method 600 may be practiced where the acquirable entities are specifically identified in the content. Thus for example, the content may include a description or identification of an entity specifically. Alternatively, the method 600 may be practiced where the acquirable entities are derived from entities specifically identified in the content. Thus, for example, comparable or related entities to those specifically identified in content may be identified. For example, if a printer is identified in the content, embodiments may identify compatible printer toner cartridges or comparable printers to those specifically identified in the content.

The method 600 may be practiced where identifying one or more acquirable entities from the content is performed by analyzing content across user devices and/or accounts for the user.

The method 600 may further include providing an in-place purchase interface to allow the user to acquire one or more of the entities. Thus, for example, a user may be able to purchase or acquire entities directly from an application from which the content is obtained. Thus, for example, embodiments may provide an interface in a web application, word processing application, or other application that allows the user to purchase identified entities.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, wearable devices (such as headsets, watches, fitness trackers, etc.), network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented process of generating a database of user acquirable entities obtained across multiple applications used by a user and irrespective of whether one or more of the multiple applications are used on different devices of the user, the computer-implemented process being performed by one or more processors executing computer executable instructions for the computer-implemented process, and the computer-implemented process comprising:

accessing one or more applications on a user interface of one or more user devices, wherein the one or more applications are associated with a given user and a given user device;

using an operating system of the given user device, searching the user interface of the given user device for particular content of the one or more applications that may be indicative of one or more acquirable entities, wherein the operating system is used if the one or more applications are installed on top of the operating system of the given user device, and wherein a user account for the given user in the context of the operating system operates to allow operating systems of different devices to collaborate based on the user account;

using an application framework, identifying at the user interface of the given user device particular content of the one or more applications that may be indicative of one or more acquirable entities, wherein the application framework is used if the one or more applications are implemented in the context of the application framework, and wherein a user account for the given user in the context of the application framework allows cross-device tracking;

inputting the particular content to a search engine running on the given user device, irrespective of whether the particular content is identified using the operating system or the application framework;

using the search engine, determining whether the particular content is indicative of one or more acquirable entities;

building from the particular content that is determined to be indicative of one or more acquirable entities a user database to store the one or more acquirable entities;

based on the particular content, identifying one or more acquirable entities from the particular content; and identifying to the given user an identification of acquirable entities stored in the user database.

2. The computer-implemented process of claim 1, wherein the particular content comprises at least one of text, video, music, images, metadata, or links.

3. The process of claim 1, wherein identifying to the given user an identification of acquirable entities is performed as a result of one or more of:

providing a charm and receiving user input;
providing a keyboard key and receiving user input;
providing a setting button and receiving user input;
providing an icon and receiving user input;
providing a toast notification and receiving user input; and
providing a soft button and receiving user input.

4. The computer-implemented process of claim 1, wherein identifying to the given user an identification of acquirable entities comprises providing a shopping list.

5. The computer-implemented process of claim 1, wherein identifying to the given user an identification of acquirable entities is performed after detecting that a user is in a location where the user may purchase one or more of the acquirable entities.

6. The computer-implemented process of claim 1, wherein determining whether the particular content is indicative of one or more acquirable entities is performed based on a history of content from one or more applications to identify at least one of relevance, frequency and pattern of content use.

7. The computer-implemented process of claim 1, wherein determining whether the particular content is indicative of one or more acquirable entities is performed by using real time context.

8. The computer-implemented process of claim 1, wherein the acquirable entities are specifically identified in the content.

9. The computer-implemented process of claim 1, wherein the acquirable entities are derived from entities specifically contained in the content.

10. The computer-implemented process of claim 1, wherein determining whether the particular content is indicative of one or more acquirable entities is performed by analyzing content across user devices for the given user.

11. The computer-implemented process of claim 1, further comprising providing an in-place purchase interface to allow the user to acquire one or more of the entities.

12. A system comprising:
one or more processors; and
one or more computer readable media comprising computer executable instructions; and
one or more processors which, when executing the computer-executable instructions, perform a computer implemented process of generating a database of user acquirable entities obtained across multiple applications used by a user and irrespective of whether one or more of the multiple applications are used on different devices of the user, and wherein the one or more processors perform the computer-implemented process by performing the following:

accessing one or more applications on a user interface of one or more user devices, wherein the one or more applications are associated with a given user and a given user device;

using an operating system of the given user device, searching the user interface of the given user device for particular content of the one or more applications that may be indicative of one or more acquirable entities, wherein the operating system is used if the one or more applications are installed on top of the operating system of the given user device, and wherein a user account for the given user in the context of the operating system operates to allow operating systems of different devices to collaborate based on the user account;

using an application framework, identifying at the user interface of the given user device particular content of the one or more applications that may be indicative of one or more acquirable entities, wherein the application framework is used if the one or more applications are implemented in the context of the application framework, and wherein a user account for the given user in the context of the application framework allows cross-device tracking;

inputting the particular content to a search engine running on the given user device, irrespective of whether the particular content is identified using the operating system or the application framework;

using the search engine, determining whether the particular content is indicative of one or more acquirable entities;

building from the particular content that is determined to be indicative of one or more acquirable entities a user database to store the one or more acquirable entities;

based on the particular content, identifying one or more acquirable entities from the particular content; and identifying to the given user an identification of acquirable entities stored in the user database.

13. The system of claim 12, wherein identifying to the given user an identification of acquirable entities comprises providing a shopping list.

14. The system of claim 12, wherein identifying to the given user an identification of acquirable entities is performed after detecting that a user is in a location where the user may purchase one or more of the acquirable entities.

15. The system of claim 12, wherein determining whether the particular content is indicative of one or more acquirable entities is performed based on a history of content from one or more applications to identify at least one of relevance, frequency and pattern of content use.

16. The system of claim 12, wherein determining whether the particular content is indicative of one or more acquirable entities is performed by using real time context.

17. The system of claim 12, wherein the acquirable entities are specifically identified in the content.

18. The system of claim 12, wherein determining whether the particular content is indicative of one or more acquirable entities is performed by analyzing content across user devices for the given user.

19. The system of claim 12, further comprising providing an in-place purchase interface to allow the user to acquire one or more of the entities.

20. One or more physical computer readable storage media comprising computer executable instructions that when executed by one or more processors cause the one or more processors to perform a computer-implemented process of generating a database of user acquirable entities obtained across multiple applications used by a user and irrespective of whether one or more of the multiple applications are used on different devices of the user, and wherein the one or more processors perform the computer-implemented process by performing the following:

accessing one or more applications on a user interface of one or more user devices, wherein the one or more applications are associated with a given user and a given user device;

using an operating system of the given user device, searching the user interface of the given user device for particular content of the one or more applications that may be indicative of one or more acquirable entities, wherein the operating system is used if the one or more applications are installed on top of the operating system of the given user device, and wherein a user account for the given user in the context of the operating system operates to allow operating systems of different devices to collaborate based on the user account;

using an application framework, identifying at the user interface of the given user device particular content of the one or more applications that may be indicative of one or more acquirable entities, wherein the application framework is used if the one or more applications are implemented in the context of the application framework, and wherein a user account for the given user in the context of the application framework allows cross-device tracking;

inputting the particular content to a search engine running on the given user device, irrespective of whether the particular content is identified using the operating system or the application framework;

using the search engine, determining whether the particular content is indicative of one or more acquirable entities;

building from the particular content that is determined to be indicative of one or more acquirable entities a user database to store the one or more acquirable entities;

based on the particular content, identifying one or more acquirable entities from the particular content; and identifying to the given user an identification of acquirable entities stored in the user database.

* * * * *